United States Patent
Moressee et al.

(10) Patent No.: US 11,214,210 B2
(45) Date of Patent: Jan. 4, 2022

(54) VEHICLE DEVICE WITH FASTENING SYSTEM FOR CRITICAL AREAS

(71) Applicant: Compagnie Plastic Omnium, Lyons (FR)

(72) Inventors: Aurélien Moressee, Sainte-Julie (FR); Jérôme Utter, Sainte-Julie (FR); Bertrand Mazue, Sainte-Julie (FR)

(73) Assignee: Compagnie Plastic Omnium SE

( * ) Notice: Subject to any disclaimer, the term of this patent is extended or adjusted under 35 U.S.C. 154(b) by 170 days.

(21) Appl. No.: 16/688,509

(22) Filed: Nov. 19, 2019

(65) Prior Publication Data

US 2020/0156578 A1    May 21, 2020

(30) Foreign Application Priority Data

Nov. 19, 2018 (FR) ........................................ 1871591

(51) Int. Cl.
*B60R 19/52* (2006.01)
*B60R 21/34* (2011.01)
*F16B 5/00* (2006.01)

(52) U.S. Cl.
CPC .............. *B60R 19/52* (2013.01); *B60R 21/34* (2013.01); *B60R 2019/527* (2013.01); *F16B 5/0076* (2013.01)

(58) Field of Classification Search
CPC .... B62D 27/04; B62D 25/084; B62D 25/085; B60B 2019/525; B60B 19/52; B60B 2021/0004; B60B 21/34
USPC .......................................... 296/187.04, 193.1
See application file for complete search history.

(56) References Cited

U.S. PATENT DOCUMENTS

| | | | |
|---|---|---|---|
| 3,792,889 A | 2/1974 | Fuener et al. | |
| 2010/0231006 A1* | 9/2010 | Okabe | B62D 25/084 296/203.02 |
| 2011/0250037 A1* | 10/2011 | Schmitz | F16B 5/065 411/511 |
| 2014/0175837 A1* | 6/2014 | Min | B60R 21/34 296/193.11 |
| 2015/0093177 A1* | 4/2015 | Morris | F16B 19/004 403/13 |
| 2018/0339674 A1* | 11/2018 | Mitchell | F16F 9/10 |
| 2020/0198706 A1* | 6/2020 | Vandermeer | B62D 27/04 |
| 2020/0207303 A1* | 7/2020 | Ebner | B60R 21/34 |

(Continued)

FOREIGN PATENT DOCUMENTS

| FR | 3059287 A1 * | 6/2016 | ............ B60R 21/34 |
|---|---|---|---|
| JP | 2002195225 A | 7/2002 | |

(Continued)

OTHER PUBLICATIONS

Search Report and Written Opinion for FR 1871591 dated May 16, 2019 (6 pages).

*Primary Examiner* — Jason S Morrow
(74) *Attorney, Agent, or Firm* — St. Onge Steward Johnston & Reens LLC (57) ABSTRACT

The invention relates to a motor vehicle device including a one-piece fastening system of the motor vehicle. This fastening system includes a fastening flange, a guiding member having at least one supporting member and a supporting surface participating in maintaining the guiding member in a first position, and an elastically deformable portion exerting a restoring force adapted to restore the guiding member into said first position.

12 Claims, 10 Drawing Sheets

(56) References Cited

U.S. PATENT DOCUMENTS

2020/0298745 A1* 9/2020 Hellberg .............. B60Q 1/0491
2021/0138985 A1* 5/2021 Park ..................... B62D 25/08

FOREIGN PATENT DOCUMENTS

| WO | 2006087439 A1 | 8/2006 |
| WO | 2008040891 A2 | 4/2008 |

* cited by examiner

VEHICLE DEVICE WITH FASTENING SYSTEM FOR CRITICAL AREAS

FIELD OF THE INVENTION

The present invention relates to the field of bodywork parts of motor vehicles. The invention deals more precisely with the integration of value-added technical devices closest to these bodywork parts, for the performance of the vehicle.

BACKGROUND OF THE INVENTION

The integration of vehicle devices, such as aerodynamic shutters, radars, lidars, cameras, sensors, etc., within the bodywork modules of motor vehicles is known. Such vehicle devices are generally arranged on a structural part of the vehicle such as, in the case of the front of the vehicle, the functional front end or the horizontal and vertical cross members, which sometimes involves a relatively remote position in relation to the zones critical to pedestrian impacts and low speed impacts of bodywork parts. Such positioning involves positioning these devices from a reference point that is not in the bodywork module but in the impact protected module. The positioning of a device relative to the bodywork part is therefore less well controlled, particularly in the case of an impact resulting in a relative displacement between the device and the bodywork part. The interfaces and tolerances between the different systems involved in the front module of the car are, therefore, less well controlled.

These devices can however be directly integrated within the bodywork parts, at areas that are not critical to pedestrian impacts and low speed impacts. However, for stylistic, functional and aerodynamic reasons, automakers tend to impose the positioning of these vehicle devices closest to the bodywork parts, in critical areas for pedestrian impacts and low speed impacts.

To do this, it has been contemplated to attach the vehicle devices directly on the bodywork part, in critical areas, by means of fixed connections, such as by screwing, gluing or welding. However, such a solution has the disadvantage of damaging the device when pedestrian impacts and low speed impacts are experienced in the critical area of the bodywork part. Therefore, there is great risk that the device will no longer work properly after an impact, which is not an acceptable solution. Indeed, according to new regulations, the devices must remain fully functional after a low speed crash and preserve the pedestrian protection equipment.

In order to respond to such a problem, it has been contemplated to connect the device directly to the bodywork part, in critical areas, via fusible links. This solution, which makes it possible to preserve the integrity of the device in case of pedestrian impacts and low speed impacts suffered by the bodywork part, has the disadvantage of requiring a systematic manual intervention to reposition the device, as soon as the connection is broken. This solution is not acceptable either.

SUMMARY OF THE INVENTION

The purpose of the invention is to remedy these disadvantages by providing a motor vehicle device comprising a fastening system to a part of the motor vehicle, the fastening system comprising:

at least one fastening flange, the fastening flange comprising a first portion having at least one orifice, at least one guide member projecting in front of the orifice along an axis substantially orthogonal to said first portion, the guide member comprising at least one support member against a first face of said first portion participating in the maintenance of the guide member in a first position, the support member being adapted to penetrate into the orifice when a force experienced by the device has an intensity greater than a threshold value, the force having a direction substantially parallel to the axis, at least one supporting surface participating in maintaining the guide member in said first position, at least one elastically deformable portion exerting a restoring force adapted to restore the guide member to said first position.

Thus, the device of the invention can be assembled directly on a bodywork part, within a critical zone for pedestrian impacts and low speed impacts, without risk of damage to the device and without the need for manual interventions, after the impact, to reposition the device.

Indeed, the device is intended to be maintained closest to a bodywork part, in a current position which corresponds to the first position of the guide member. When the intensity of the different forces experienced by the device does not exceed a predetermined threshold value, the threshold value below which the device and its performance are not degraded by these forces, the supporting member participates in maintaining the guide member in the first position. Thus, the device as a whole remains in a substantially stationary position.

In the following description, the term "stationary position" or "stationary part of an component" is understood to be the position or part of the component considered with reference to a member of the vehicle known to remain substantially stationary within the assembled vehicle, and to do this, throughout the life of the vehicle, such a member being, for example, the white box of the vehicle.

In the remainder of the description, the expression "supporting surface" means the supporting surface against which a component of the device of the invention different from the support member takes support. In other words, the supporting surface is a surface distinct from the first face of the first portion of the fastening flange. The supporting surface according to the invention can be of two types, namely a type "located opposite the first face" and a type "allowing the support of a clipping member". These two types are detailed later.

When a pedestrian impact or a low speed impact generates a force having a direction substantially parallel to the axis of the guide member, and an intensity whose value exceeds that of the predetermined threshold value, the supporting member is arranged to penetrate into the orifice of the fastening flange.

When the supporting member enters the orifice present in the first portion of the fastening flange, in its stroke it drives the remainder of the guide member, another portion of which also penetrates into the orifice. This generalized movement of the guiding member involves a displacement, along the axis of the guiding member, of a movable part of the device, with reference to a portion of the fastening flange arranged to remain in a stationary position (hereinafter referred to as the "fixed part of the fastening flange"). This movable part of the device comprises in particular the guiding member and the functional members of the device which it is necessary to guard against too violent impacts.

Such displacement of the movable part of the device continues until a stroke end position of the guiding member is reached. Such a position corresponds to an extreme position beyond which the movable part of the device cannot be moved. Such a position is chosen so that the intensity of the force generated by the impact has been sufficiently absorbed so that the device is not damaged. In other words, the movable part of the device can be moved from a first position, in which it is held stationary, to an end position from which it is restored to return to the first position. When the end position is reached, the restoring force of the elastically deformable part of the device is sufficient to initiate a displacement of the mobile part of the device, in the opposite direction, and until the guiding member is restored to its first initial position. Thus, during the crash, the device is guarded against any degradation, and after the crash, the device is repositioned in its functional position, and without any handling intervention being necessary. The restoring force of the elastically deformable part is sufficient to, on the one hand, replace the movable part of the device, after the crash, to its first initial position, and on the other hand to withstand the aerodynamic and vibratory forces exerted during driving. In other words, the elastically deformable part of the device also participates in maintaining the guiding member in the first position.

Advantageously, the supporting surface is facing said first face.

Thus, when the guiding member is in the first position, the latter is constrained between the first face of the first portion of the fastening flange and said supporting surface. Therefore, in combination with the elastically deformable part of the fastening system, the guiding member, and by extension the movable part of the device, is held in a stationary position from which it exits only when the intensity of the force undergone by the device exceeds the predetermined threshold value.

The supporting surface against which the guiding member takes support in the first position may be a portion of the surface of the bodywork part which is located opposite the first portion of the fastening flange.

Alternatively, said supporting surface may be an extension of the fixed part of the fastening flange, wherein such an extension is also located opposite its first portion. Thus, the fastening flange has, on two opposite sides, areas of contact with the guiding member. In this variant of the invention, the displacement of the guiding member is limited by these two opposite sides of the fastening flange, whose fixed part then has a U-shape. Therefore, the maintenance of the guiding member in the first position is better controlled. Indeed, this U-shaped configuration of the fastening flange enables the guiding member to be held stationary in the first position, which is dependent on only one element, in this case the fixed part of the fastening flange.

Advantageously, the supporting surface is a second face of said first portion, the device and the device comprise at least one clipping member to said second face participating in maintaining the guiding member in the first position.

Thus, the maintenance of the guiding member in the first position can also be secured by means of one or more clipping members. Such a clipping member is arranged to be supported on the second face of the first portion which corresponds to the face opposite to the first face against which the supporting member is held in the first position. Thus, in combination with the elastically deformable part, such a clipping member allows the guiding member to be held in the first position, without the need for a supporting surface of the type "located opposite the first face" being necessary.

However, it is also an embodiment of the invention in which the device is provided both with a supporting surface of the type "located opposite the first face" and with a supporting surface of the type "enabling support of a clipping member". In other words, the device of the invention according to this embodiment comprises at least two supporting surfaces and clipping members. In this embodiment, maintaining the guiding member in the first position is more secure.

Advantageously, the supporting member comprises at least one chamfer.

Thus, the supporting member has a shape more adapted to making it possible for it to slide towards the entrance of the orifice of the fastening flange, when the intensity of the force undergone by the device exceeds the threshold value. Such an advantageous characteristic makes it possible to predict the penetration of the support member with greater precision. Therefore, the displacement of the guide member and, by extension, the assembly of the moving part of the device can also be planned with greater precision. The risk of deterioration of the device is therefore reduced.

Advantageously, the fastening flange comprises at least one chamfer, preferably located in the peripheral zone of the orifice against which the supporting member is held, when the guiding member is in the first position.

Thus, it is also possible to predict the penetration of the supporting member with increased accuracy.

In order to promote the penetration of the supporting member into the orifice, when the intensity of the force undergone by the device exceeds the threshold value, the guiding member may be made, at least partially, from a material having stiffness properties to promote sliding of the supporting member into the input of the orifice. In other words, at least a part of the guiding member may be able to be elastically deformed so as to allow or accompany the sliding between the supporting member and the first face of the first portion of the fastening flange. Such an elastically deformable portion of the guiding member may, for example, be the supporting member itself which, under the increase of the force experienced by the device, is compressed with greater intensity against the first face and deforms. Such an elastically deformable portion may also be the narrowed portion.

The fastening flange may also have properties to promote the sliding of the supporting member into the input of the orifice. It may for example comprise a peripheral zone to the orifice which has stiffness properties allowing it to deform when the supporting member exerts too much pressure on the latter.

Advantageously, the device comprises at least one end stop of the guide member.

It is thus possible to limit the displacement of the guiding member along its longitudinal axis between two extreme positions, namely the first position and the end position. In doing so, it is possible to avoid excessive displacement of the guiding member which could cause a collision between the movable part of the device and an element of the environment close to the vehicle. Such a stop may in particular be arranged on the fixed part of the fastening flange, more precisely on its first portion and projecting from its first face towards the guiding member. Alternatively, it may be provided on the movable part of the device, for example on the guiding member, and project from the latter in the direction of the first portion of the fastening flange. In another variant, the device may comprise at least two end stops of the guiding member, one of them being arranged on the first portion of the fastening flange and protruding from its first face in the direction of the guiding member and the other being arranged on the movable part of the device and projecting from the latter in the direction of the first portion of the fastening flange. Advantageously, these two stops are located facing one another in order to come into contact with one another, and thus determine the end position of the guiding member.

Advantageously, the guiding member comprises at least one narrowed portion from the supporting member.

Thus, the restoring force exerted by the elastically deformable part on the guiding member is locally compensated more effectively. Indeed, given the presence and dimensioning of this narrowed portion, friction forces are locally applied between the guiding member and the wall of the orifice and are greater as the guiding member is restored to the first position. Therefore, this return is controlled and occurs more slowly, which promotes a smooth return to the first position, without risk of damage to the device or the bodywork part. Thus, it is possible to overcome the risks that can cause an uncontrolled restoring force of the guiding member, for example a poor positioning of the device or a degradation of the latter.

Advantageously, the elastically deformable part comprises a spring.

This spring can be arranged between the fastening flange and the base of the guiding member in particular to participate in maintaining the movable part of the device in the first position, by exerting a compressive force on the guiding member.

Advantageously, the elastically deformable portion comprises a tab on the fastening flange.

Such tab on the fixing flange can be used cumulatively with, or in replacement of, the previously mentioned spring. Such tab is part of a portion of the fastening flange which is separate from its fixed part. Indeed, such tab has properties enabling it, at the same time, to exert a compressive force on a movable part of the device, in order to participate in its stationary maintenance in the first position, to be deformed when the intensity of the force experienced by the device exceeds the threshold value and to participate in the restoration of the movable part of the device in the first position.

Advantageously, the motor vehicle device comprises a sensor adapted to detect a return of the guiding member to the first position.

Thus, it is possible to confirm electronically, directly, the good return of the guiding member to the first position. Such sensor may be of any type of sensor which makes it possible to detect an element in a predetermined position. Such sensor is programmed, in the device according to the invention, to confirm the position of the guiding member in the first position. Such sensor may, for example, be a position sensor, an optical sensor, an ultrasonic sensor, etc.

Moreover, it is also possible to confirm this good return positioning, indirectly, by referring to the proper functioning of a functional member that may be present within the device of the invention. Indeed, the device according to the invention may comprise, in its so-called movable part, functional members such as radars, lidars or optical sensors. The proper functioning of these members depends on their good position within the vehicle. For example, the device may comprise a radar or lidar whose poor repositioning to the first initial position, after an impact, can be detected via an error message or via failure to perform their function. Such indirect determination may be used in substitution for a direct determination, carried out by a sensor dedicated to this purpose, but also in addition to the latter. This last variant makes it possible to have a double check of the good return to the first position and, if necessary, to diagnose the malfunction of the dedicated sensor or the functional organ.

The invention also relates to an assembly of a bodywork part and a motor vehicle device according to any one, or any of the compatible combinations of the embodiments previously presented, an assembly in which the supporting surface is a portion of the surface of the bodywork part located opposite the first portion of the fastening flange.

Advantageously, the fastening flange is integrated into the bodywork part.

Advantageously, the bodywork part is a structural part of a motor vehicle, the structural part preferably being chosen from the list consisting of: a bumper, an opening, a grill.

BRIEF DESCRIPTION OF THE DRAWINGS

The invention will be better understood upon reading the appended figures, which are provided by way of examples and are by no means limiting, and in which.

DETAILED DESCRIPTION OF THE INVENTION

Figure 1:
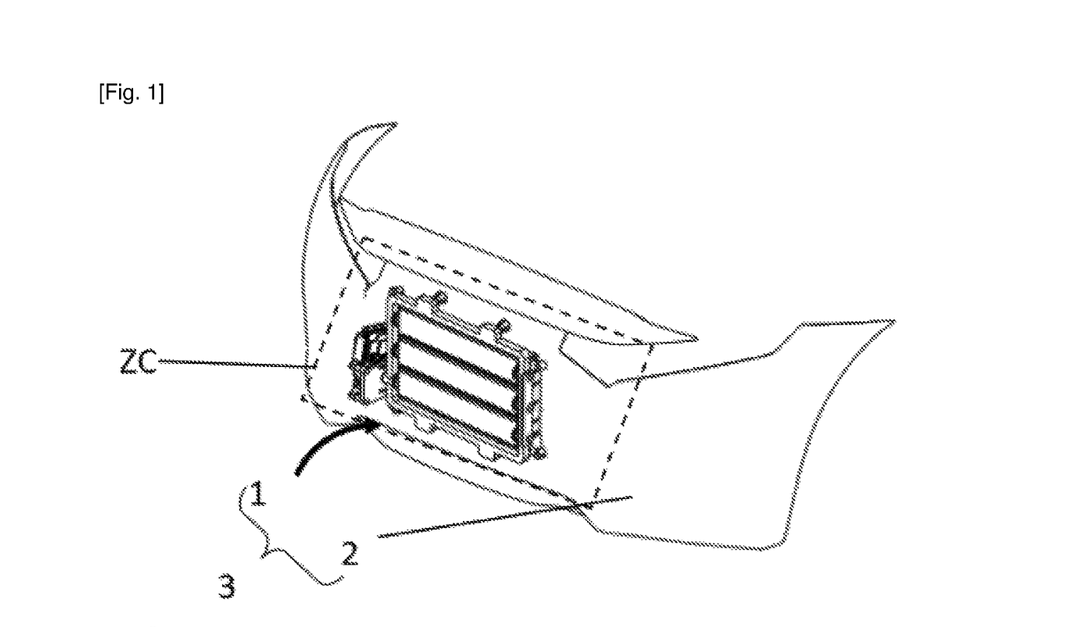
FIG. 1 is a perspective view of a front face of a motor vehicle.
Figure 2:
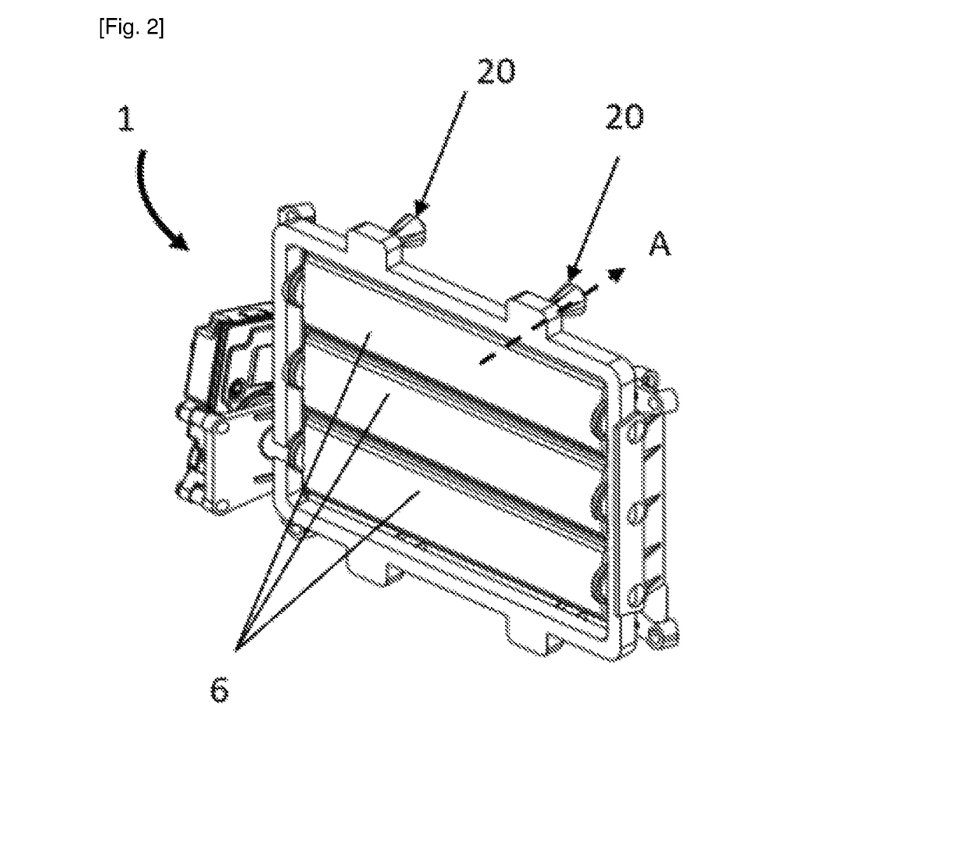
FIG. 2 is a perspective view of constituent components of the same device of the invention according to a first embodiment.
Figure 3:
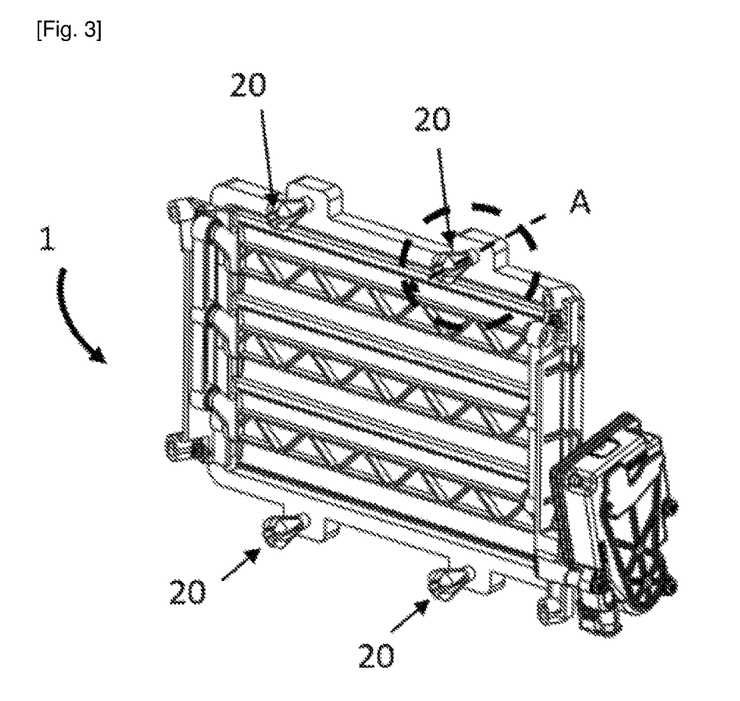
FIG. 3 is a perspective view of constituent components of the same device of the invention according to a first embodiment.
Figure 4:
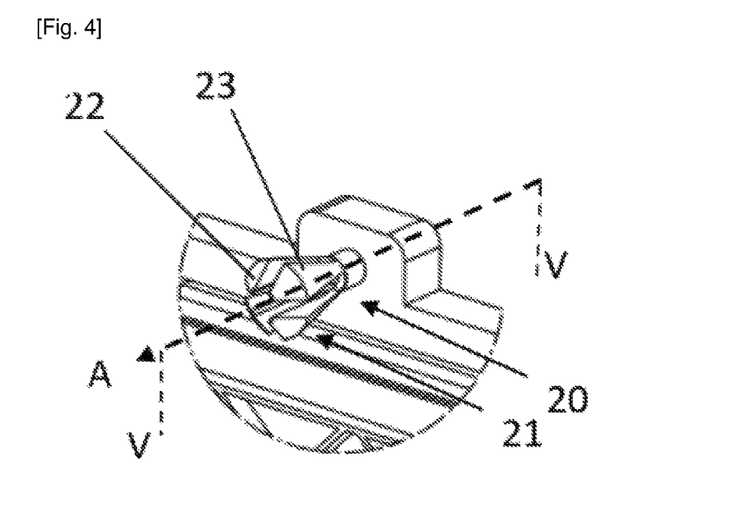
FIG. 4 is a perspective view of an enlargement of the dotted line area of FIG. 3.

The motor vehicle device 1 according to one embodiment of the invention is adapted to be fastened to a stationary part of the vehicle (not shown), while being positioned closely to a bodywork part 2, within a critical zone ZC for pedestrian impacts and low speed impacts of the bodywork part 2. For example, the device 1 can be positioned in a critical zone ZC of a bumper 2 of a front face of the vehicle (FIG. 1).

The vehicle device 1 of the invention comprises a fastening system which, in the embodiments shown in FIGS. 1 to 3 and 14 to 16, comprise four fastening flanges 10, four guiding members 20, and four supporting surfaces 15, 17 or 40 and four elastically deformable parts. Of course, the device of the invention may comprise a different number of fastening flanges 10, guiding members 20, supporting surfaces 15, 17 or 40 and elastically deformable parts.

Figure 5:
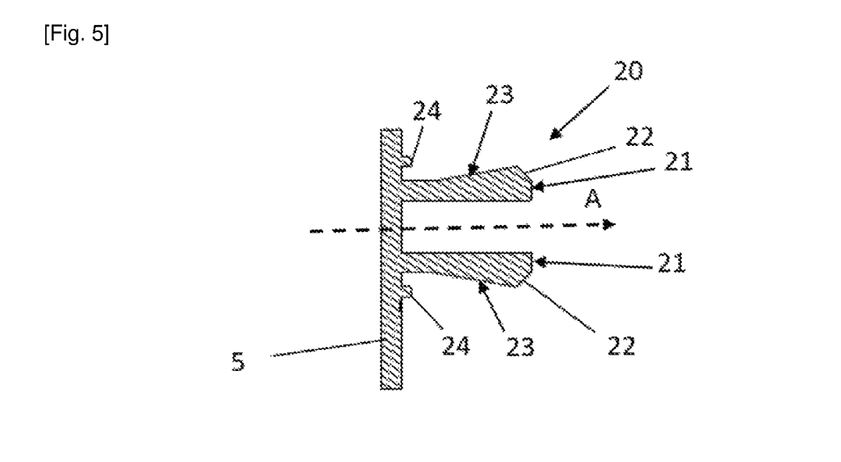
FIG. 5 is a cross-sectional view along the plane V-V of FIG. 4 showing a guiding member and a part of the main body of a device according to the first embodiment.
Figure 6:
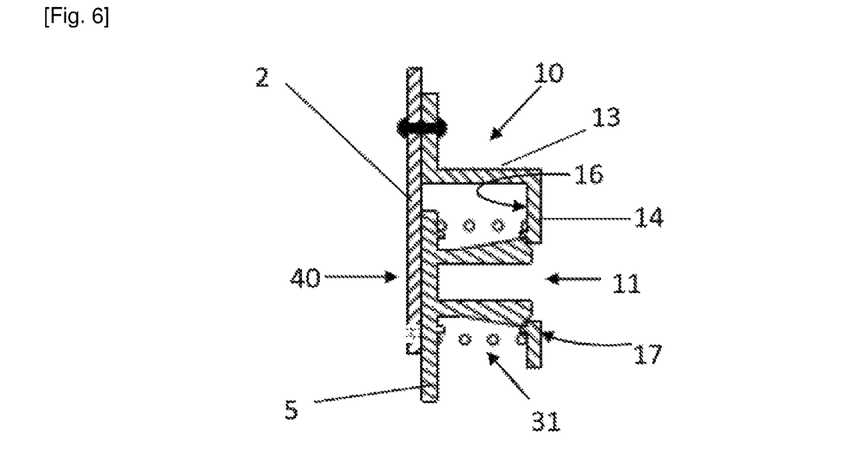
FIG. 6 is a cross-sectional view of a part of a device according to the first embodiment of the invention.
Figure 7:
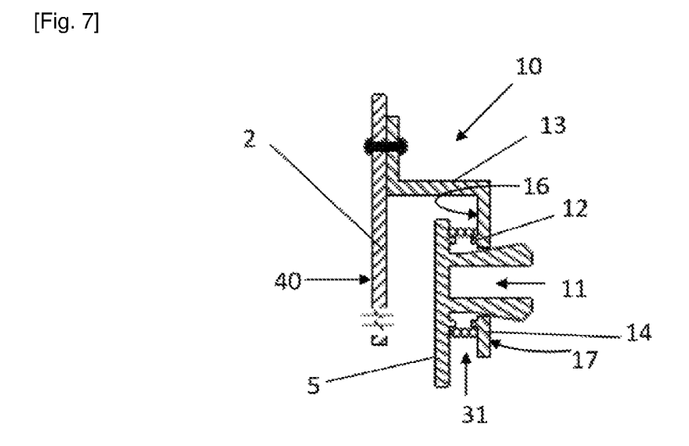
FIG. 7 is a cross-sectional view of a part of a device according to the first embodiment of the invention.
Figure 13:
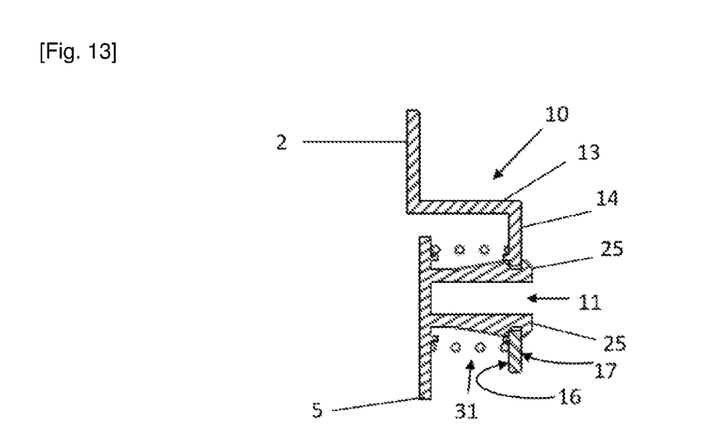
FIG. 13 is a cross-sectional view of a part of a device according to a fifth embodiment of the invention.
Figure 14:
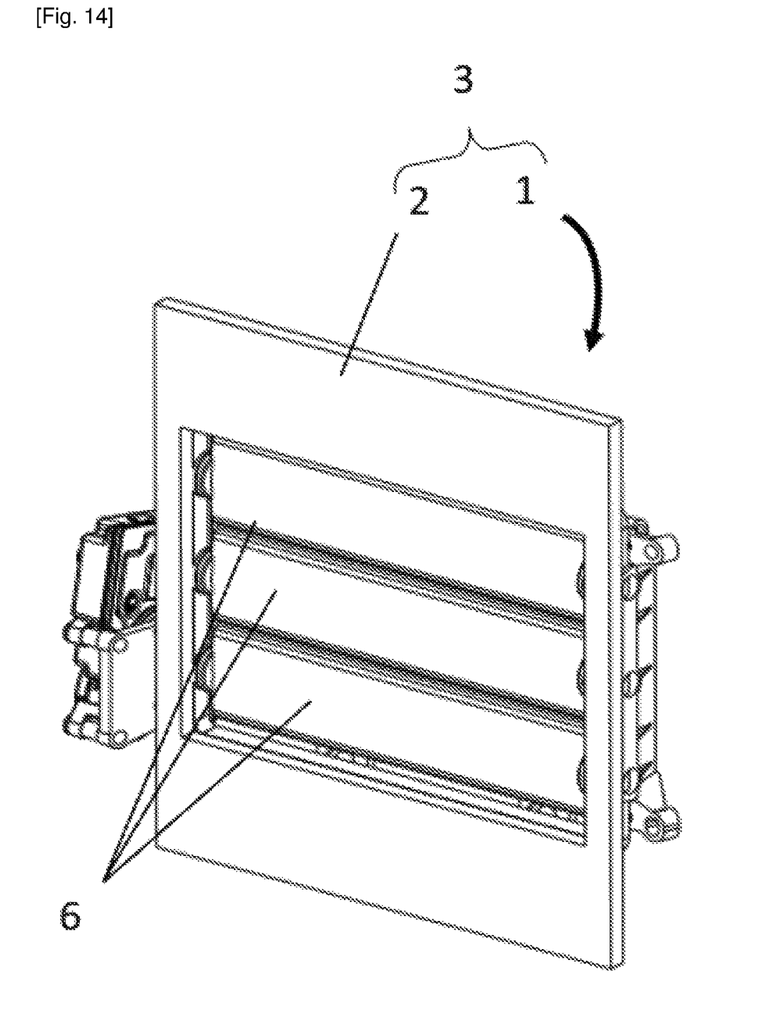
FIG. 14 is a perspective view of constituent components of the same assembly according to the first embodiment of the invention.
Figure 15:
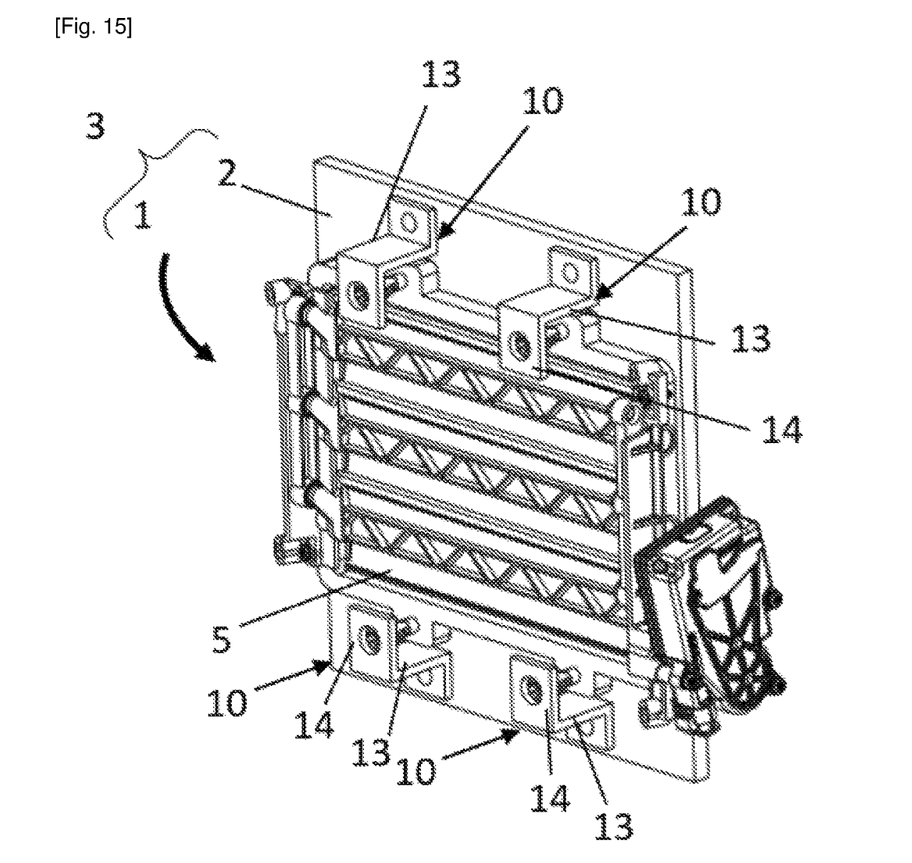
FIG. 15 is a perspective view of constituent components of the same assembly according to the first embodiment of the invention.
Figure 16:
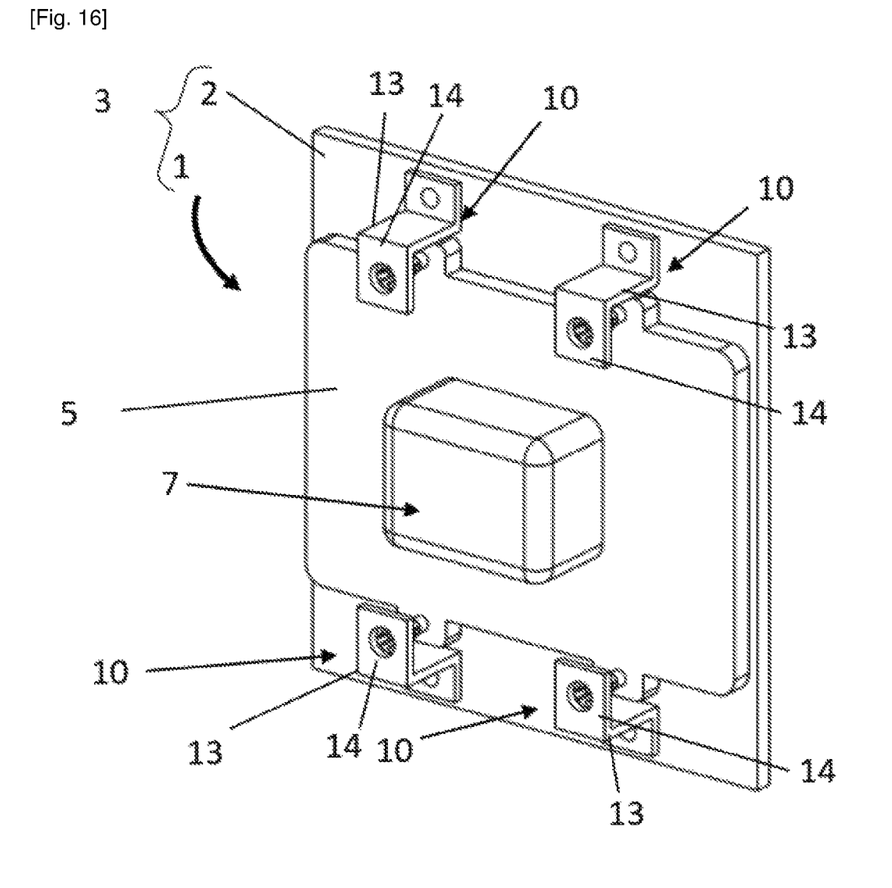
FIG. 16 is a perspective view of components constituting an assembly according to a sixth embodiment of the invention.

For reasons of readability and clarity of the figures, the elastically deformable parts have not been illustrated in FIGS. 14 to 16. For these same reasons, the references relating to the supporting member 21 and common to FIGS. 5 to 13, have only been reproduced in FIG. 5.

The device 1 comprises a movable part, generally composed of a main body 5 and guiding members 20. This part of the device 1 is qualified as movable because it is able to be displaced in both directions by a direction of displacement parallel to the longitudinal axis A of a guiding member 20. The main body 5 itself comprises one or more functional members of the device 1, in this case aerodynamic flaps 6 (FIGS. 1 to 3 and 14 to 15) and a radar 7 (FIG. 16).

The device 1 also comprises a stationary part, which generally corresponds to the fastened part 13 of each fastening flange 10.

Each fastening flange 10 has an orifice 11 located in a first portion 14 offset from the fastening portion to the bodywork part 2. These different portions are present in the fastened part 13 of the fastening flange 10. Such a fastened part 13 is arranged to remain in a stationary position. In the embodiments shown in FIGS. 6 to 12, the fastening between a fastening flange 10 and the bodywork part 2 is provided by screwing. However, any other technique known to the person skilled in the art and which ensures a secure attachment between these two elements can be used. The fastening flange 10 has a Z-shape, which gives it both a high mechanical strength and the possibility of having a first remote portion, in which the orifice 11 is formed, as well as an end stop 12. Of course, the fastening flange 10 may have any other suitable shape that meets all the criteria mentioned.

In an embodiment not shown, the fastening flange may be attached to another structural part of the vehicle, or even be an extension of such a structural part. In such an embodiment, the fastening flange does not necessarily have a shape making it possible to offset the first portion having the orifice relative to the fastening portion.

In another embodiment (FIG. 13), the fastening flange 10 and the bodywork part 2 form a single piece. In other words, it is the shape given to an area of the bodywork part 2 which makes it possible to form the fastening flange 10. Such an embodiment has the advantage of not requiring an assembly step between the fastening flange 10 and the bodywork part 2.

The supporting members 21 of a guiding member 20 are supported against the first face 16 of the first portion 14 of the fastening flange 10, in which the orifice 11 is present, when the device 1 is in the first position (FIGS. 6, 8, 10, 11 and 13). Each guiding member 20 comprises four supporting members 21 which each comprise a chamfer 22 for promoting the sliding of the supporting members 21 in the orifice 11, and then their penetration within the latter. The angle of the chamfer 22 is dimensioned to ensure, in combination with the stiffness properties of the elastically deformable part and the position of the supporting surface 15, 17 or 40, the retaining of the guiding member 20 against the first portion 14, when the device must remain in the first position.

Each guiding member 20 also comprises narrowed portions 23 formed along the axis A, from the supporting members 21 to the main body 5. Such dimensioning of these narrowed portions 23 makes it easier to control the restoration of the movable part of the device 1, when the supporting members 21 have entered the orifice 11, after the vehicle has undergone a pedestrian impact or low-speed impact. Indeed, when the guiding member 20 is in a position different from the first position, for example a position close to the end position (FIGS. 7, 9 and 12), and the intensity of the force undergone by the device 1 becomes less than the intensity of the restoring force of the elastically deformable part, the latter then causes a displacement in the opposite direction of the guiding member 20, to the first position. This restoring force is compensated locally by forces of opposite directions, these forces being due to friction between the narrowed portions 23 and the wall of the first portion 14 defining the orifice 11. Given the narrowness of these portions 23 of the guiding member 20, the intensity of the local friction forces increases as the guiding member 20 is restored to the first position. This makes it possible to more precisely control the return of the guiding member 20, and by extension the return of the movable part of the device 1, to the first position (FIGS. 6, 8, 10, 11 and 13). Such a precisely controlled return makes it possible in fine to preserve the integrity of the device 1 and thus to increase its life in the vehicle.

In all the embodiments shown in all the figures, the guiding members 20 are connected in one piece to the main body 5. To do this, the guiding members 20 and the main body 5 can be formed as a single piece, for example, molded. However, it is also possible to form the guiding members 20 and the main body 5 independently of each other, and then to assemble them together later.

Figure 8:
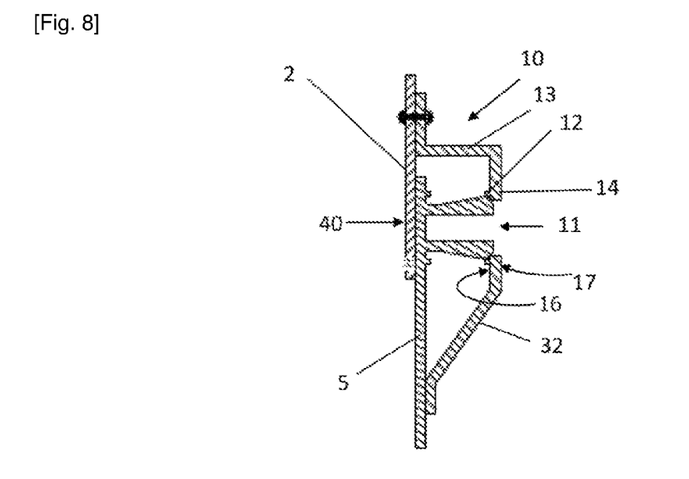
FIG. 8 is a cross-sectional view of a part of a device according to a second embodiment of the invention.
Figure 9:
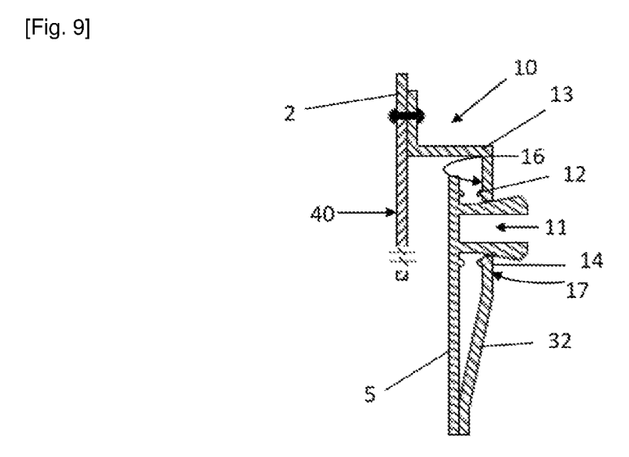
FIG. 9 is a cross-sectional view of a part of a device according to a second embodiment of the invention.
Figure 10:
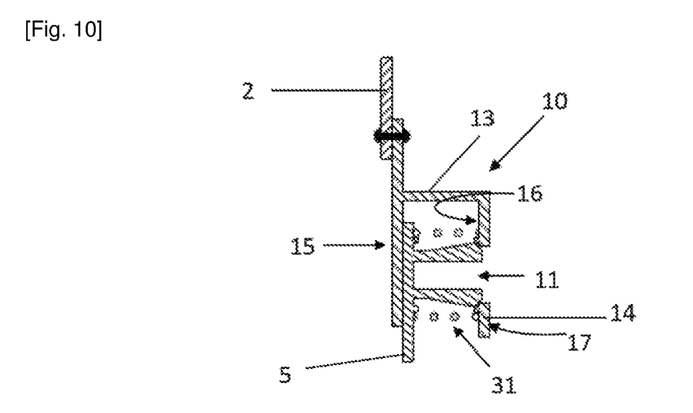
FIG. 10 is a cross-sectional view of a part of a device according to a third embodiment of the invention.

The elastically deformable part may comprise a spring 31 (FIGS. 6, 7, 10 to 13) or an elastically deformable tab 32 of the fastening flange 10 (FIGS. 8 and 9). In embodiments in which the elastically deformable part of the device 1 comprises a spring 31, the latter may be prestressed in order to limit possible movements of the device 1, when the latter is in the first position, caused by the aerodynamic forces experienced by the vehicle being driven. In embodiments in which the elastically deformable portion of the device 1 comprises a tab 32, the latter is arranged to exert efforts on the main body 5 so as to participate in maintaining the guiding member 20 in the first position. When the intensity of the different forces experienced by the device 1 exceeds the predetermined threshold value, the tab 32 is deformed by the movement of the mobile part of the device 1. Thus, the tab 32 slides along the main body 5 (FIG. 9), accompanying the movement of the movable part of the device 1 to the maximum end position.

In the various embodiments illustrated in FIGS. 6 to 9 and 14 to 16, the movable part of the device 1 rests directly on the portion 40 of the bodywork part forming a supporting surface, when the device 1 is in the first position. Thus, such a configuration allows a better distribution of aerodynamic and vibrational forces during driving, thereby ultimately contributing to the immobility of the movable part of the device 1 in the first position. In the embodiment shown in FIG. 10, the fastening flange 10 comprises, within its fixed part 13, an extension 15 forming a supporting surface, located opposite the first face of the first portion 14 having the orifice 11, against which the guiding member 20 rests, when it is in the first position. In other words, the fixed part 13 of the fastening flange 10 has a U-shape suitable for maintaining the device 1 in the first position when such a maintenance is required. This allows, in particular, the avoiding of any damage to the bodywork part 2, following an impact, which would no longer properly maintain the device 1 in the first position.

Figure 11:
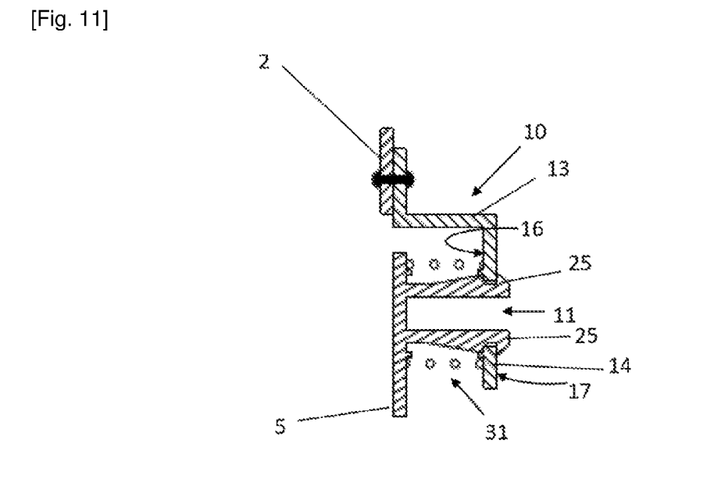
FIG. 11 is a cross-sectional view of a part of a device according to a fourth embodiment of the invention.
Figure 12:
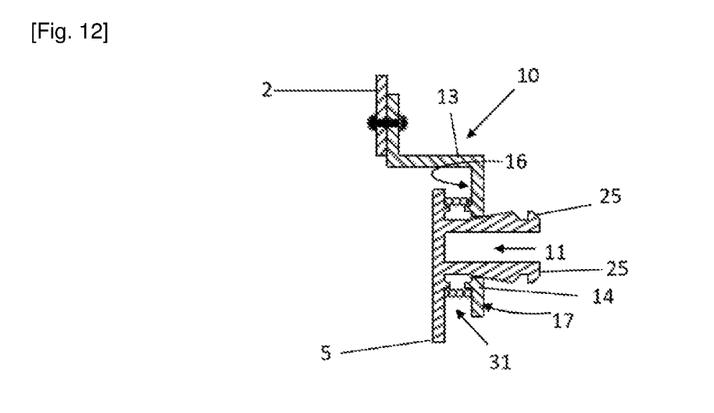
FIG. 12 is a cross-sectional view of a part of a device according to a fourth embodiment of the invention.

In the embodiments shown in FIGS. 11 to 13, the device 1 comprises clipping members 25 on a second face 17 of the first portion 14, the second face 17 forming a supporting surface. These clipping members 25 participate in maintaining the movable part of the device 1 in the first position. In such embodiments, it is no longer necessary for a supporting surface of the type facing the first face 16 to be present. Indeed, the clipping members 25 each extend, along the axis A of the guiding member 20, from a supporting member 21 and abut on the second face 17 of the first portion 14, which is a face opposite to the first face 16 against which the supporting members 21 rest in the first position. In doing so, the clipping members 25 and the elastically deformable part are dimensioned so as to position the main body 5 of the device 1 in the correct position relative to the bodywork part 2. In these embodiments, the main body 5 of the device 1 has been positioned at a slight removal from the surface of the bodywork part 2. Thus, it is possible to position the device 1 in a critical zone ZC while protecting it against a direct impact. Although a supporting surface 14 or 40 of the type facing the first face 16 is not necessary for the proper functioning of the device 1 according to this embodiment, it may nevertheless be present according to one of the variants previously described, in order to participate in a more secure maintenance of the movable part of the device 1. Indeed, in the case of damage to the clipping member 25, the presence of such a supporting surface 15 or 40 of this type ensures the proper functioning of the device, and despite such damage.

The device 1 and the assembly 3 of the invention function as follows.

The device 1 is mounted within a critical zone ZC of the vehicle closest to a bodywork part 2, the bodywork part 2 may be a bumper, an opening, a grille, etc.

When the bodywork part 2 is impacted, which involves a force undergone by the device 1 having an intensity greater than a threshold value, and a direction substantially parallel to the axis A of the guiding member 20, the supporting members 21 slide in the hole 11 and enter it. There follows a generalized movement of the entire movable part of the device 1, until it reaches, at most, the end position, in which the end stop 12 of the fastening flange 10 and the end stop 24 of the guiding member 20 meet.

This displacement of the movable part of the device 1 involves the compression of the elastically deformable part of the device 1. When the intensity of the restoring force of the elastically deformable part becomes greater than the intensity of the force experienced by the device 1, a displacement of the movable part of the device 1, in the opposite direction, is initiated. This displacement is controlled, in particular by virtue of the friction between the narrowed portions 23 of the guiding member 20 and the wall of the fastening flange 10 delimiting the orifice 11, and resulting in the return of the device 1 to the first position.

LIST OF REFERENCES

1: vehicle device
2: bodywork part
3: assembly of a bodywork part and a vehicle device
5: main body
6: aerodynamic flap
7: radar
10: fastening flange
11: orifice
12: end stop of the fastening flange
13: fixed part of the fastening flange
14: first portion of the fastening flange
15: extension of the fastening flange forming a supporting surface
16: first face of the first portion
17: second face of the first portion forming a supporting surface
20: guiding member
21: supporting member
22: chamfer
23: narrowed portion
24: end stop of the guiding member
25: clipping member
31: spring
32: fastening flange tab
40: portion of the bodywork part forming a supporting surface
A: axis of the guiding member
ZC: critical zone for pedestrian impacts and low-speed impacts

What is claimed is:

1. A device of a motor vehicle comprising a system for fastening to a part of the motor vehicle, characterized in that the fastening system comprises:
    at least one fastening flange, the at least one fastening flange comprising a first portion having at least one orifice,
    at least one guiding member projecting from the orifice along an axis substantially orthogonal to said first portion, the guiding member comprising at least one supporting member against a first face of said first portion participating in maintaining the guiding member in a first position, the supporting member being able to penetrate in the orifice when a force experienced by the device has an intensity greater than a threshold value, the force having a direction substantially parallel to the axis,
    at least one supporting surface participating in maintaining the guiding member in said first position,
    at least one elastically deformable portion exerting a restoring force adapted to return the guiding member to said first position.

2. The device according to claim 1, wherein the supporting surface is facing said first face.

3. The device according to claim 1, wherein the supporting surface is a second face of said first portion, the device comprising at least one clipping member at the second face participating in maintaining the guiding member in said first position.

4. The device according to claim 1, wherein the supporting member comprises at least one chamfer.

5. The device according to claim 1, comprising at least one end stop of the guiding member.

6. The device according to claim 1, wherein the guiding member comprises at least one narrowed portion from the supporting member.

7. The device according to claim 1, wherein the elastically deformable part comprises a spring.

8. The device according to claim 1, wherein the elastically deformable part comprises a tab of the at least one fastening flange.

9. The device according to claim 1, comprising a sensor adapted to detect a return of the guiding member to the first position.

10. An assembly of a bodywork part and a motor vehicle device according to claim 1, wherein the supporting surface is a portion of a surface of the bodywork part facing the first portion of the at least one fastening flange.

11. The assembly according to claim 10, wherein the at least one fastening flange is integral with the bodywork part.

12. The assembly according to claim 10, wherein the bodywork part is a structural part of a motor vehicle.

* * * * *

UNITED STATES PATENT AND TRADEMARK OFFICE
CERTIFICATE OF CORRECTION

PATENT NO. : 11,214,210 B2
APPLICATION NO. : 16/688509
DATED : January 4, 2022
INVENTOR(S) : Aurélien Moressee et al.

It is certified that error appears in the above-identified patent and that said Letters Patent is hereby corrected as shown below:

On the Title Page

Item (71), Line 1:
Compagnie Plastic Omnium, Lyons
Should be changed to:
Compagnie Plastic Omnium, Lyon

Signed and Sealed this
First Day of August, 2023

Katherine Kelly Vidal
*Director of the United States Patent and Trademark Office*